(12) United States Patent
Jones

(10) Patent No.: US 7,531,926 B2
(45) Date of Patent: May 12, 2009

(54) MOTOR PROTECTOR ENDSHIELD MOUNTING BRACKET

(75) Inventor: Patrick M. Jones, Kirkwood, MO (US)

(73) Assignee: Emerson Electric Co., St. Louis, MO (US)

( * ) Notice: Subject to any disclaimer, the term of this patent is extended or adjusted under 35 U.S.C. 154(b) by 507 days.

(21) Appl. No.: 11/359,312

(22) Filed: Feb. 22, 2006

(65) Prior Publication Data

US 2007/0194643 A1     Aug. 23, 2007

(51) Int. Cl.
*H02K 5/00*     (2006.01)

(52) U.S. Cl. .......................... 310/89; 310/68 C; 310/71

(58) Field of Classification Search .............. 310/68 C, 310/71, 89, 91
See application file for complete search history.

(56) References Cited

U.S. PATENT DOCUMENTS

| | | | | |
|---|---|---|---|---|
| 4,236,092 A | * | 11/1980 | DiFlora | ................... 310/68 C |
| 4,791,329 A | * | 12/1988 | Ubukata et al. | ........... 310/68 C |
| 4,858,303 A | * | 8/1989 | Fisher | .......................... 29/596 |
| 4,890,025 A | * | 12/1989 | Hadeler et al. | ............. 310/68 C |
| 4,914,329 A | * | 4/1990 | Ottersbach | ................. 310/68 C |
| 4,926,081 A | * | 5/1990 | DiFlora et al. | ................. 310/89 |

OTHER PUBLICATIONS

Admitted Prior Art: Motor Protector Endshield Mounting Bracket photos, 4 pages.
Admitted Prior Art: Texas Instruments, Klixon® Thermal Protector, Three-phase Manual or Automatic Reset Types MY, MW, CY, CW, and BY, Document #MCKS001, 2 pages.

* cited by examiner

*Primary Examiner*—Thanh Lam
(74) *Attorney, Agent, or Firm*—Senniger Powers LLP

(57) ABSTRACT

A bracket for mounting a motor protector on an endshield of a motor comprises a tube sized and shaped for receiving the protector. The tube includes at least one integrally formed fastener for fastening the protector to the bracket. At least one integrally formed projection extends outwardly from the tube to facilitate fastening the bracket to the endshield of the motor.

22 Claims, 5 Drawing Sheets

MOTOR PROTECTOR ENDSHIELD MOUNTING BRACKET

FIELD OF THE INVENTION

The present invention relates generally to a motor having a bracket for mounting an electric motor protector, and more particularly to a bracket for mounting a motor protector to an endshield of the motor.

BACKGROUND OF THE INVENTION

Manual reset motor protectors are used to cut power to a motor under conditions that may damage the motor, such as overheating or electrical overload. Once the source of the problem has been corrected, the power to the motor is restored by pushing a reset button located on the protector. Such protectors should be mounted as close to the windings of the motor as possible so that they can detect the heat of the windings. However, the manual reset button on the protector should be accessible from outside the motor. Accordingly, it is often desirable to mount the protector to the inside of the motor endshield.

Many manual reset motor protectors include mounting "ears" that allow the protector to be mounted to an endshield of the motor using conventional fasteners. However, in order to meet UL limited short circuit testing and electrical spacing requirements, additional devices are often needed. These devices may include gaskets, mylar sleeves, endshield flame barriers, and housings.

For automatic reset protectors without mounting ears, a simple stamped metal bracket has been provided in prior art motors. However, this bracket is not appropriate for manual reset protectors because it is not designed to handle the load imposed by pushing the manual reset button. It also does not, by itself, enable the motor to meet UL limited short circuit testing requirements, and therefore the aforementioned additional devices are often employed. Moreover, the prior art does not include an appropriate bracket for mounting an "earless" manual reset protector to a motor endshield.

SUMMARY OF THE INVENTION

In one aspect, a bracket for mounting a motor protector on an endshield of a motor comprises a tube sized and shaped for receiving the protector. The tube includes at least one integrally formed fastener for fastening the protector to the bracket. At least one integrally formed projection extends outwardly from the tube to facilitate fastening the bracket to the endshield of the motor.

In another aspect, an electric motor comprises a rotor, a stator in magnetic coupling relation to the rotor and having windings, and an endshield disposed at an end of the rotor and stator. A bracket secures the motor protector to the endshield and is formed of a flame retardant material.

In still another aspect, the motor comprises a housing receiving the rotor and stator and a manual reset motor protector. The bracket comprises a tube having an open end for receiving the protector and an opposite end having a hole sized to receive a reset button of the protector. The bracket includes integral detents, each detent mating with a portion of the protector. The bracket includes outwardly extending ears having holes therethrough for receiving fasteners that extend into the endshield. The bracket is formed of an electrically insulating, flame retardant material.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION OF THE DRAWINGS

Figure 1:
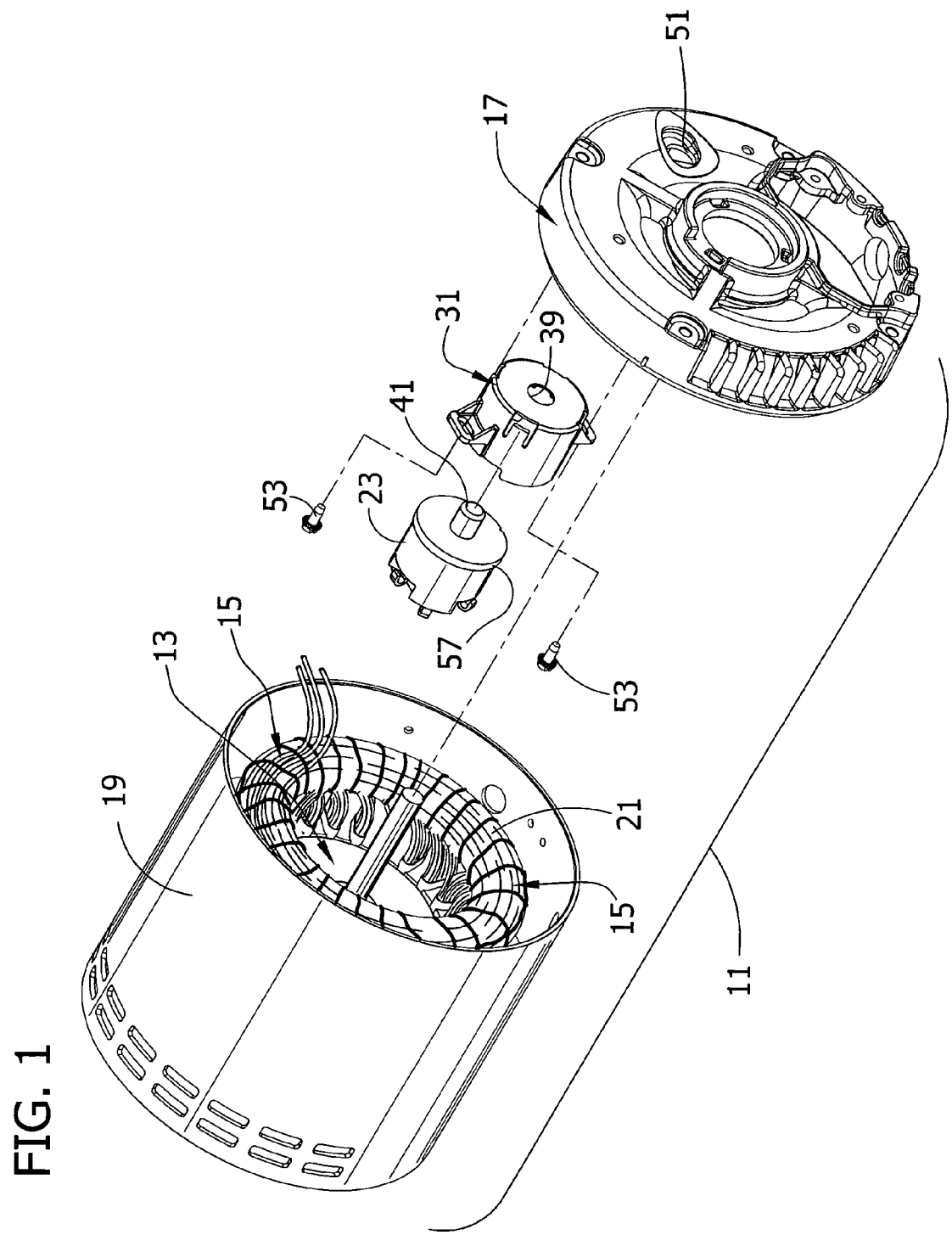
FIG. 1 is an exploded view of the motor.

Referring to FIG. 1, an electric motor 11 of one embodiment generally comprises a rotor 13, a stator 15 in magnetic coupling relation to the rotor, an endshield 17, and a housing 19 receiving the rotor and stator. The stator 15 generally includes windings 21 that are connected to a manual reset motor protector 23. The protector 23 may also be connected to other components, such as a power connection (terminal) board (not shown). The endshield 17 is disposed at one end of the rotor 13 and stator 15. This general motor configuration is merely one example, and many other configurations are contemplated within the scope of this invention. A bracket 31 is generally adapted to receive the protector and secure it between the endshield 17 and stator 15.

Figure 3:
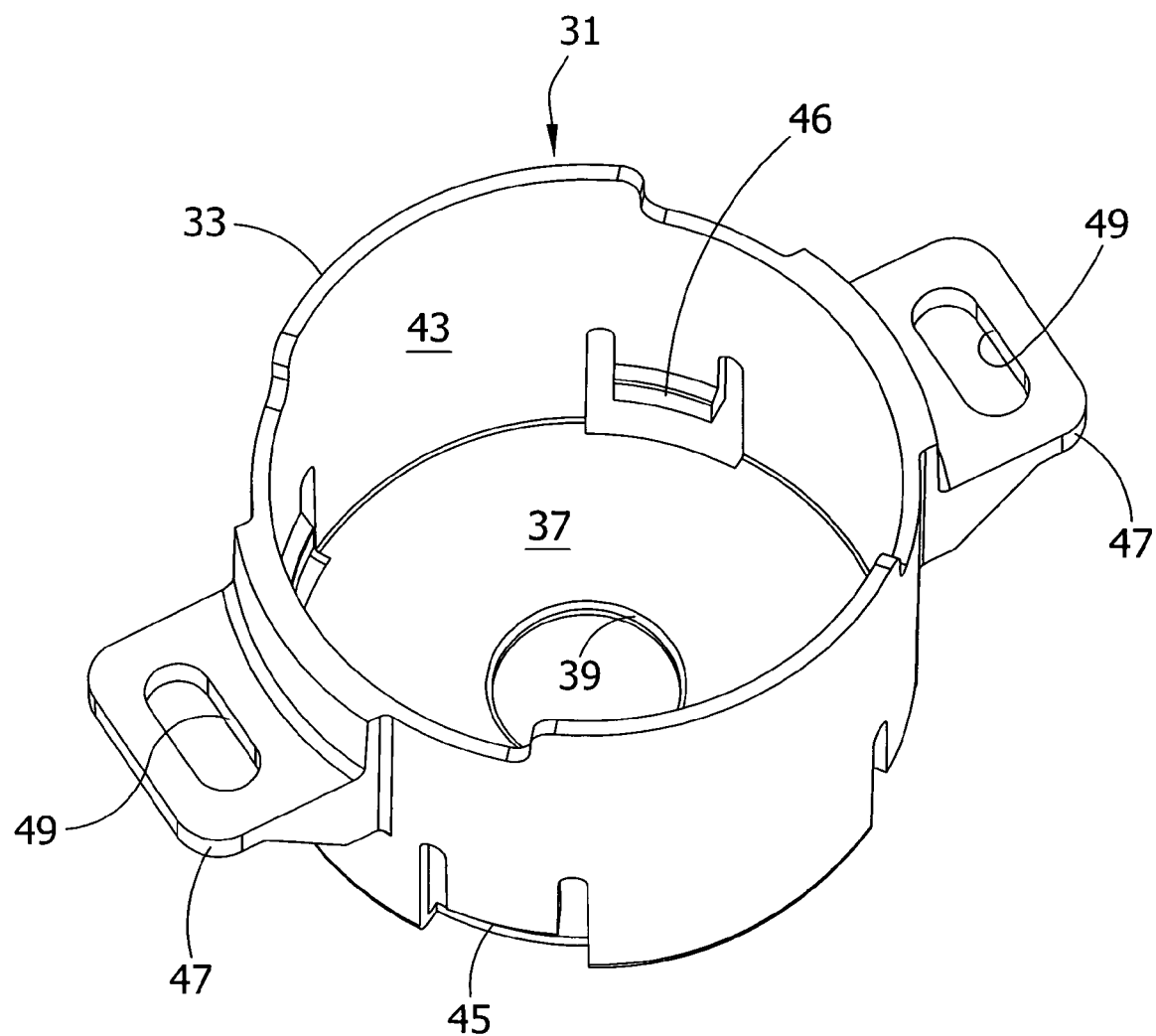
FIG. 3 is a perspective view of the bracket.
Figure 4:
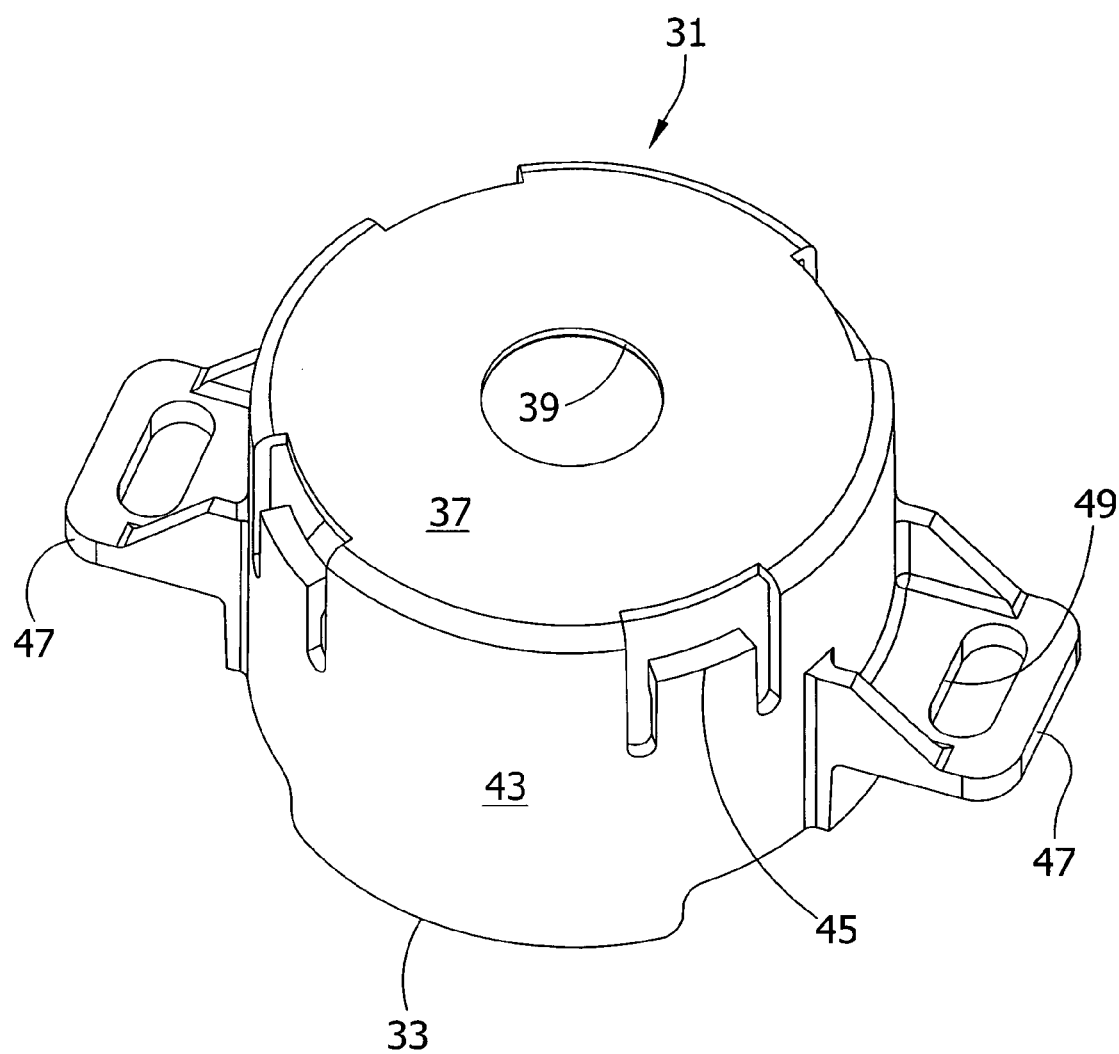
FIG. 4 is an inverted perspective view of the bracket.
Corresponding reference characters indicate corresponding parts throughout the drawings.

Referring now to FIGS. 3 and 4, the bracket 31 of this embodiment comprises a tube 33 having an open end and a partially closed opposite end. An integrally formed endwall 37 covers most of the partially closed end but includes a hole 39 for receiving a reset button 41 of the protector 23 (FIG. 1). A sidewall 43 of the tube 33 includes integrally formed detents 45 (e.g., four in this embodiment). Each detent 45 may include an inwardly extending shoulder 46. These detents 45 are formed adjacent the endwall 37, but may be formed elsewhere on the bracket 31. Projections, e.g., integrally formed ears 47 (two are shown) extend outward from the sidewall 43 near the open end, each ear including a slot 49 therethrough. These projections 47 may also be formed in other locations on the bracket 31. The bracket 31 of this embodiment is formed as a single piece of injection molded, flame retardant plastic. This material is also electrically insulating. Other materials are contemplated within the scope of the invention.

Referring back to FIGS. 1 and 2, the bracket 31 is aligned with the endshield 17 so that the hole 39 in its endwall 37 is generally aligned with a hole 51 in the endshield. Screws 53 are inserted through the slots 49 in the ears 47 and engage internally threaded posts 55 in the endshield 17 to fasten the bracket 31 to the endshield. It should be understood that many other fastening configurations are contemplated.

Figure 2:
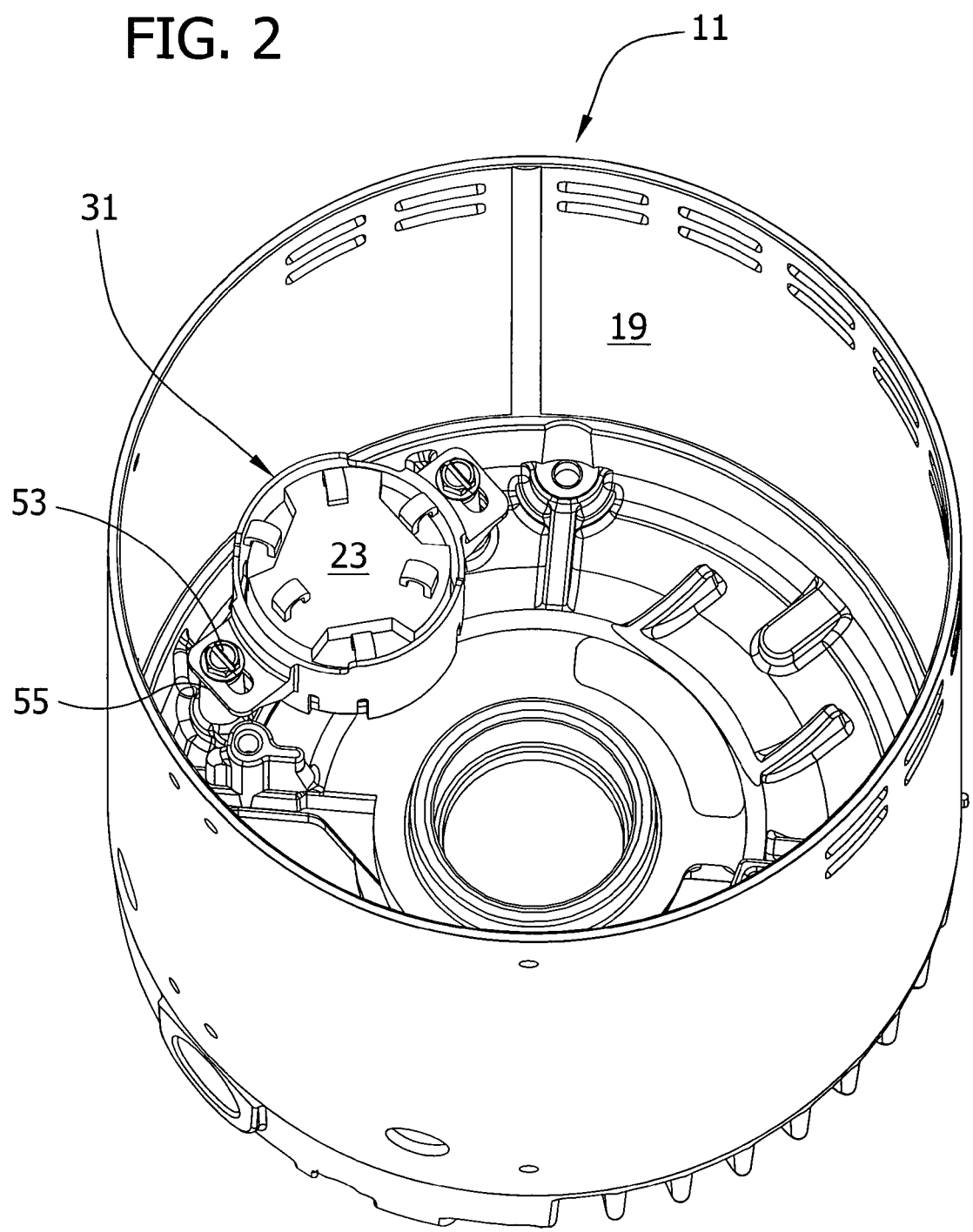
FIG. 2 is a perspective view of a portion of the motor including an endshield, a motor protector, a bracket, and a housing.
Figure 2A:
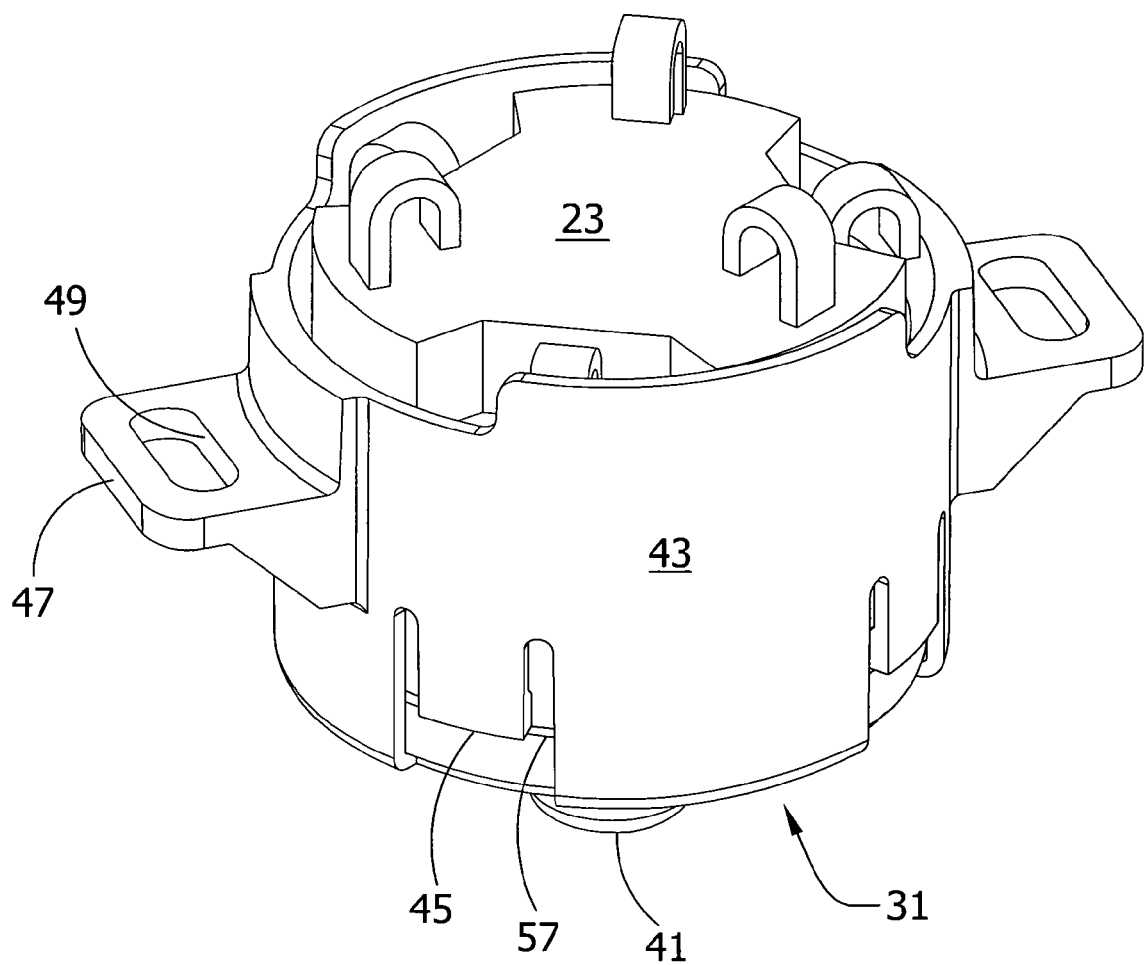
FIG. 2A is a perspective of the protector and bracket.

As best shown in FIG. 2A, the protector 23 is securely-fastened to the bracket 31 solely by the detents 45. Each detent 45 interlocks under a flange 57 of the protector 23 so that the protector cannot be removed without releasing all of the detents. In this embodiment, as the protector 23 is inserted into an open end of the bracket 31, an audible "snap" sound will be heard, indicating to the installer that the detents 45 have interlocked with the protector. Further, no other fasteners are required to fasten the protector 23 to the bracket 31. Note that the reset button 41 is received through the hole 39 in the endwall 37 of the bracket 31 and through the aligned hole 51 in the endshield 17 (FIG. 2). Also, the assembly steps may be performed in any order.

The bracket 31 of this embodiment is advantageous because no additional parts are required to pass UL testing. The bracket 31 is formed of flame retardant material, and the bracket includes integral barriers (e.g., the tube and endwall) that enable it to pass UL electrical clearance and short circuit testing without the need for additional parts. For example, no gasket is needed between the bracket and endshield. Embodiments of the invention also provide for faster motor assembly due to the "snap fitting" of the motor protector into the bracket. The bracket is not limited to the mounting of protectors of the manual reset style, but may also be used to mount "earless" automatic reset style protectors as well. This has the advantage of eliminating the need for the stamped metal bracket described above in the Background. Reduced parts count and faster assembly provide a significant savings in manufacturing costs.

The above description is also applicable to other motor configurations such as inside out motors and/or motors having windings in the rotor and permanent magnets in the stator, and visa versa. The description refers to an electric motor throughout, but one skilled in the art knows that an electric motor may be configured as a generator. The motor embodying the invention may be a direct current motor wherein the windings are connected to a commutation circuit, single phase alternating current (AC) motor wherein the windings are connected to a single phase AC source, or any multiple phase AC motor wherein the windings are connected to more than one AC source and the AC sources are not in phase.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A bracket for mounting a motor protector on an endshield of a motor comprising:
   a tube sized and shaped for receiving the protector, the tube including:
   at least one integrally formed fastener for fastening the protector to the bracket,
   at least one integrally formed projection extending outwardly from the tube to facilitate fastening the bracket to the endshield of the motor.

2. The bracket of claim 1 wherein an end of the tube includes an integrally formed wall having a hole therethrough for receiving a manual reset of the motor protector.

3. The bracket of claim 2 wherein the tube is formed of a flame retardant material.

4. The bracket of claim 3 wherein the flame retardant material is an injection molded plastic and is electrically insulating.

5. The bracket of claim 1 wherein an end of the tube is open for receiving the motor protector.

6. The bracket of claim 1 wherein the tube comprises two of the integrally formed projections, each projection shaped to engage the endshield.

7. The bracket of claim 6 wherein each projection includes a hole for receiving a fastener therethrough, the fastener mating with the endshield of the motor.

8. The bracket of claim 7 wherein there is no gasket between the end of the tube and the endshield.

9. The bracket of claim 1 wherein the tube includes two of the integrally formed fasteners, each fastener including a detent for mating with a portion of the protector.

10. An electric motor comprising:
    a rotor,
    a stator in magnetic coupling relation to the rotor and having windings,
    a housing surrounding the stator and rotor,
    an endshield disposed at an end of the rotor and stator and attached to an end of the housing,
    a motor protector for protecting the motor from damage, and
    a bracket securing the motor protector to the endshield, the bracket being formed of a flame retardant material.

11. The electric motor of claim 10 wherein the bracket comprises a tube sized and shaped for receiving the protector and having first and second ends, the tube including:
    at least one integrally formed fastener adjacent the second end of the tube for fastening the protector to the bracket,
    at least one integrally formed projection extending outwardly from the tube to facilitate fastening the bracket to the endshield.

12. The electric motor of claim 11 wherein the second end of the tube includes an integrally formed wall for at least partially closing the second end of the tube.

13. The electric motor of claim 12 wherein the protector includes a manual reset button.

14. The electric motor of claim 13 wherein the wall includes an opening for receiving the button.

15. The electric motor of claim 12 wherein the first end of the tube includes an opening for receiving the motor protector.

16. The electric motor of claim 11 wherein the tube comprises two of the integrally formed projections, each projection shaped to engage an endshield of the motor.

17. The electric motor of claim 16 wherein each projection includes a hole for receiving a fastener therethrough, the fastener mating with the endshield of the motor.

18. The electric motor of claim 16 wherein the second end of the tube is shaped to engage the endshield.

19. The electric motor of claim 11 wherein the tube includes two of the integrally formed fasteners, each fastener including a detent for mating with a portion of the protector.

20. An electric motor comprising:
    a rotor,
    a stator in magnetic coupling relation to the rotor and having windings,
    an endshield disposed at an end of the rotor and stator,
    a housing receiving the rotor and stator,
    a manual reset motor protector for protecting the motor from damage, and
    a bracket receiving the protector and securing the motor protector to the endshield,
    the bracket comprising a tube having an open end for receiving the protector and an opposite end having a hole sized to receive a reset button of the protector,
    the bracket including integral detents, each detent mating with a portion of the protector, the bracket including outwardly extending ears having holes therethrough for receiving fasteners that extend into the endshield,
the bracket being formed of an electrically insulating, flame retardant material.

21. An electric motor comprising:

a rotor;

a stator in magnetic coupling relation to the rotor and having windings;

an endshield disposed at an end of the rotor and stator;

a motor protector for protecting the motor from damage, the motor protector including a manual reset button; and a bracket securing the motor protector to the endshield and formed of a flame retardant material, the bracket comprising a tube sized and shaped for receiving the protector, the tube including: (a) first and second ends; (b) at least one integrally formed fastener adjacent the second end of the tube for fastening the protector to the bracket; and (c) at least one integrally formed projection extending outwardly from the tube to facilitate fastening the bracket to the endshield, wherein the second end of the tube includes an integrally formed wall for at least partially closing the second end of the tube.

22. The electric motor of claim 21 wherein the wall includes an opening for receiving the button.

* * * * *